June 6, 1967

S. E. WEBSTER 3,323,625

DETACHABLE POWER ASSEMBLY

Filed July 28, 1965

INVENTOR.
*Sidney E Webster*
BY
*Whiteley and Caine*
ATTORNEYS

United States Patent Office 3,323,625
Patented June 6, 1967

3,323,625
DETACHABLE POWER ASSEMBLY
Sidney E. Webster, Minneapolis, Minn., assignor to Thermo King Corporation, Minneapolis, Minn., a corporation of Delaware
Filed July 28, 1965, Ser. No. 475,391
4 Claims. (Cl. 192—112)

The present invention relates to improvements in supporting and connecting a portable driving member with a fixed driven member. More particularly the invention relates to improvements in a mechanical power assembly construction, whereby a source of mechanical power may be readily detached and removed from the mechanism to which it is operably connected.

In many compact, enclosed mechanical units the source of mechanical power, such as an engine, is quite inaccessible should maintenance be required, and is removed from the unit for repairs or replacement only with considerable difficulty.

These problems are particularly present in the removal of an engine from a compact refrigeration assembly such as a transport refrigeration unit. Prior assemblies which require disconnection of all mountings and pulley belts and the like, before somehow lifting the engine out of the unit, have entailed considerable time, effort, and expense in removing an engine for replacement or repairs.

An object of the present invention is to provide a construction for quickly detaching a portable driving member from a fixed driven member, whereby the driving connection between such members is easily detached, and the driving member is supported for movement between a connected and a disconnected position.

Another object of the invention is to provide a connection between a portable engine and fixed driven mechanism which requires no disconnection of pulley belts for removal of the engine from the driven mechanism.

A further object of this invention is to provide a means for connecting and supporting a driving member, such as an engine, within a mechanical unit whereby removal of the engine does not require disconnection of a multiplicity of mounting bolts and the lifting of the engine out of the enclosed unit, but merely the turning of a hand-operated locking device and the lateral movement of the engine onto a supporting means, without the use of special tools.

These and other objects and advantages of the present invention will be apparent from the following specification and claims; reference being had to the accompanying drawings, wherein:

Figure 3:
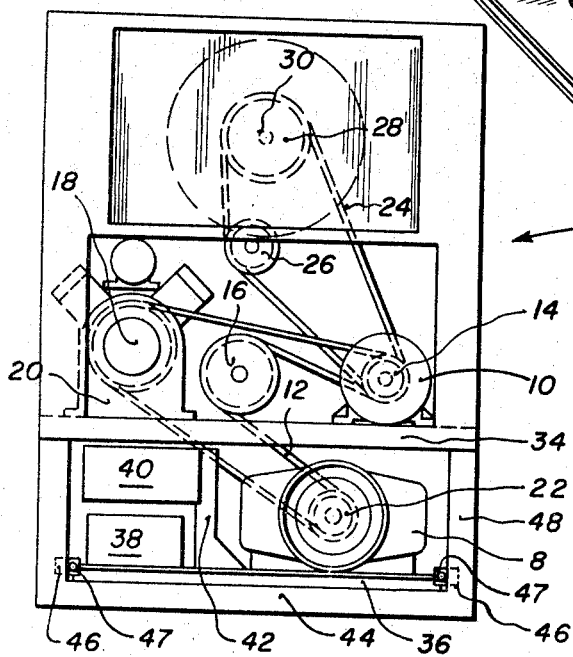
FIG. 3 is a front view of a refrigeration unit, the lower portion of which is shown in perspective in FIGS. 1 and 2.

FIG. 3 represents a common type of transport refrigeration unit which may be operated by an internal combustion engine 8 in land transit and operated by an electric motor 10 when the carrier is stationary at a warehouse or terminal or on board ship. A first pair of drive belts 12 operably connect a pulley 14 on the electric motor 10, a first idler pulley 16, a pulley 18 on a compressor 20 and a clutch pulley 22, shown in perspective in FIG. 5 and in enlarged sectional view in FIG. 6. A second drive belt 24 operably connects the pulley 14 of the electric motor 10, a second idler pulley 26, and a pulley 28 on a fan shaft 30.

A rectangular housing or casing indicated by general reference numeral 32, which contains the parts herein described, is divided horizontally across its forward portion by a shelf 34, upon which the compressor 20 and the electric motor 10 are mounted and supported.

Figure 1:
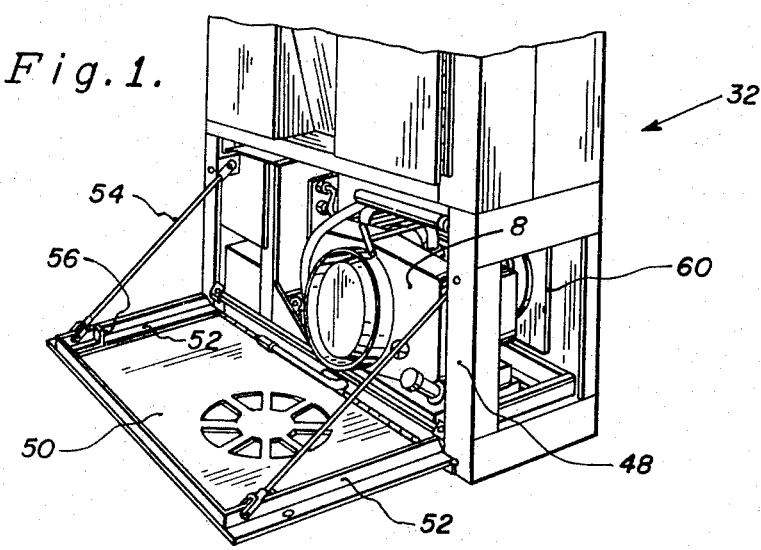
FIG. 1 is a perspective view of a lower portion of a refrigeration unit, showing an engine used as a source of mechanical power in the unit.
Figure 2:
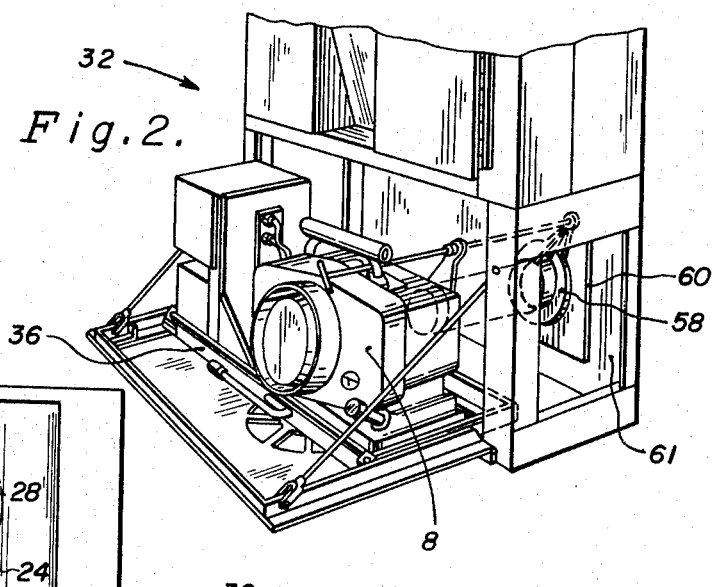
FIG. 2 is a perspective view of a lower portion of a refrigeration unit with its engine disconnected and withdrawn.

The engine 8 is positioned within a tray 36, and also within the tray 36, adjacent the engine 8, is a battery 38, and an engine control box 40 is supported above the battery 38 by a brace 42 which is secured to the tray 36. The tray 36 is supported within the housing 32 on a base panel 44 of the housing 32, and is free to slide forward relative to the base panel 44 out of the housing 32 to an extended position as shown in FIG. 2. When the tray 36 is disposed within the housing 32, as shown in FIG. 1, it is secured in said position by a pair of rectangular tray locks 46 that are carried on bolts 47 and may be turned to lock the tray in its secured position as shown in FIG. 3. In removing the tray 36, the tray locks 46 are turned away from the corners of the tray, and it is free to slide forward relative to the base panel 44 out of the housing 32.

Referring now to FIGS. 1 and 2, a front panel 50 is hinged at its lower edge along the edge of the base panel 44 to allow the front panel 50 to pivot on its lower edge between a closed position, adjacent the front corner braces 48 and covering the front lower portion of housing 32, and an open position as shown in FIGS. 1 and 2 in the same plane as the base panel 44 and abutting it, so as to allow the tray 36 to slide forward onto the front panel 50 as shown in FIG. 2. Affixed to each of the two lateral portions of the inner surface of front panel 50 are L-shaped tracks 52 which provide guides for the lateral edges of tray 36 to prevent lateral movement of the tray as it slides forward onto the front panel 50 as shown in FIG. 2. The front panel 50 is supported in its open position parallel to the base of housing 32 and at right angles to the front of housing 32 by a cable 54 on each side of the panel 50. One end of each cable 54 is secured to the upper portion of tracks 52, and the other end of each cable 54 is secured to the upper portion of the front corner braces 48. Lugs 56 extending transversely from the inner surfaces of each of the L-shaped tracks 52 limit the forward displacement of tray 36.

Figure 5:
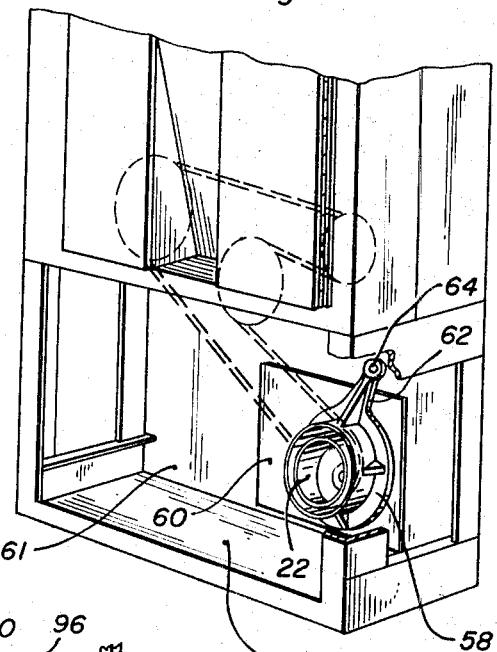
FIG. 5 is a perspective view of a lower portion of the refrigeration unit shown in FIGS. 1-3 with the engine and a hinged front panel removed to show a clutch pulley.
Figure 6:
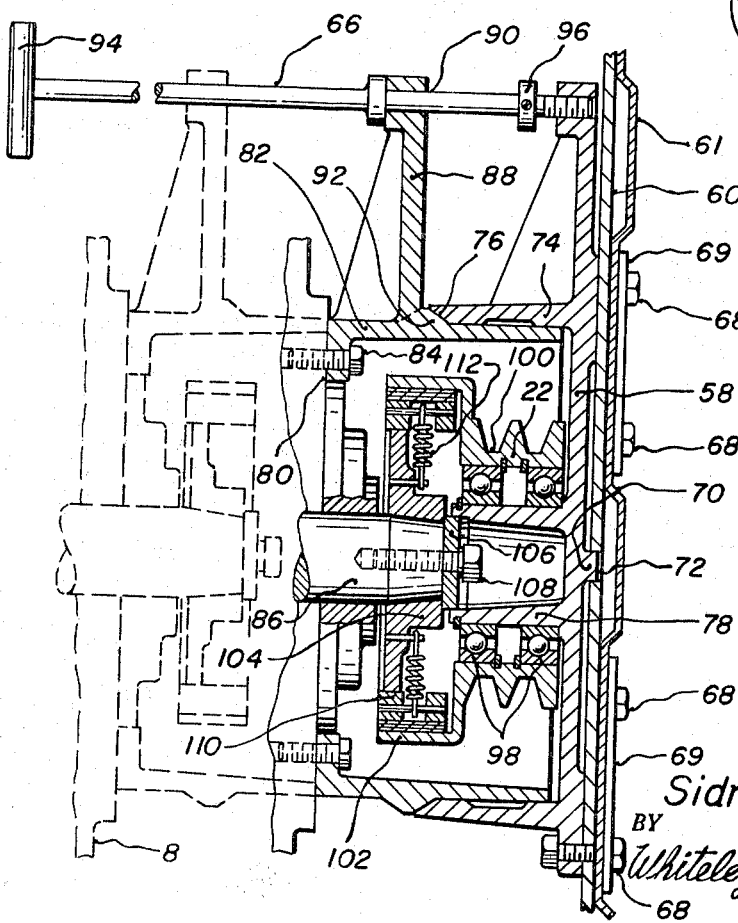
FIG. 6 is an enlarged sectional view of a connection or coupling between the engine shown in FIG. 4 and the clutch pulley shown in FIG. 5.

Referring to FIGS. 5 and 6, a clutch pulley mounting plate 58 is affixed to a reinforcing plate 60 of a rear panel 61 of housing 32. The mounting plate 58 is substantially circular and has an upper extending portion 62 which has a threaded opening 64 to receive a hand operated locking bolt 66, rotatably supported on the engine 8. The locking bolt 66 is turned into the threaded opening 64 to secure the engine 8 in operating position.

Figure 4:
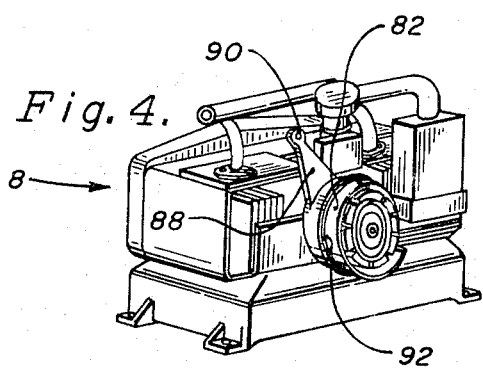
FIG. 4 is a perspective view of an engine used in a refrigeration unit.

Referring now to FIGS. 4, 5 and particularly FIG. 6, the connection between the engine 8 and the clutch pulley 22 will be described. The clutch pulley mounting plate 58 is secured to the reinforcing plate 60 and the rear panel 61 of housing 32 by several bolts 68 which are rigidly secured to bolt plates 69 which are affixed to the back of rear panel 61 and extend through the rear panel 61 and the reinforcing plate 60. Thus the mounting plate 58 may be secured to the rear panel 60 by the bolts 68 which extend from the rear panel into the housing 32 without the necessity of access to the rear of the unit. A raised pin 70 at the center of the rear surface of mounting plate 58 extends through an opening 72 in rear panel 60 to further secure and locate the mounting plate 58 in position on panel 60.

A first circular mounting plate flange 74 extends transversely from mounting plate 58, and has a notched portion, not shown, to permit passage of the drive belts 12. The extended edge of flange 74 is tapered inwardly to provide the circular flange 74 with a flared edge 76. Concentrically disposed within the circumference of flange 74 is a second circular flange 78.

As shown in FIG. 6, a peripheral flange 80 of a cylinder 82 is secured by bolts 84 to the engine 8, and within cylinder 82 at its center is located a driving member 86 of engine 8. A portion of the cylinder 82 is cut away as shown in FIG. 4 to permit passage of the drive belts 12. A supporting arm 88 extends transversely from the outer surface of cylinder 82 and is provided with an opening 90 through which the hand operated locking bolt 66 is inserted. Near the rear portion of the exterior surface of cylinder 82 is a tapered raised ridge 92, having a taper which corresponds to the taper of the flared edge 76 of circular mounting plate flange 74. The outer diameter of cylinder 82 is substantially equal to the inner diameter of circular flange 74, to allow cylinder 82 to slide from a position indicated by the broken lines in FIG. 6 into frictional engagement wtih circular flange 74 to a point where the flared edge 76 of circular flange 74 engages the cooperating taper of the ridge 92 on cylinder 82, as indicated by the solid line portion of FIG. 6. To secure the cylinder 82 and the circular flange 74 in an engaged position, the hand operated lock bolt 66 is rotated by a bolt handle 94 into the threaded opening 64 in the extended portion 62 of mounting plate 58. A retaining collar 96 prevents withdrawal of bolt 66 from the opening 90 to prevent its loss.

Referring to FIG. 6, the clutch pulley 22 is mounted on the circular mounting plate flange 78 by means of bearings 98 interposed between pulley 22 and circular flange 78 to provide relatively frictionless rotation of pulley 22. The outer surface of pulley 22 is provided with two grooves 100 designed to receive the pair of drive belts 12. A peripheral flange 102 extends transversely from the edge of pulley 22, and is adapted to be engaged by a centrifugal clutch member 104, which is secured to the driving member 86 of engine 8 by a washer 106 and a cap screw 108. The centrifugal clutch member 104 embodies a multiplicity of weights 110 extending radially from the driving member 86 and carried by clutch member 104. Springs 112 allow the weights 110 to be extended by centrifugal force during rotation of driving member 86 to engage the peripheral flange 102 of pulley 22. The weights 110 are retracted by the springs 112 when the engine 8 is inactive, and are disengaged from the peripheral flange 102 of pulley 22.

The operation of the invention is as follows: In removing the engine 8 for maintenance or repairs, the hinged front panel 50 is lowered from a vertical closed position to horizontal open position as shown in FIG. 1, where it is supported by cables 54. A fuel line and exhaust tube, not shown, are disconnected. Handle 94 of locking bolt 66 is turned to disconnect the engine 8 from rear panel 60, and tray locks 46 are loosened and rotated toward the corner braces 48 to permit tray 36 containing the engine 8, the engine control box 40 and the battery 38 to be pulled forward out of the unit, where the engine is then accessible for replacement or repairs. The foregoing procedure is reversed to return the engine to its operating position secured with the unit. The cylinder 82, affixed to the engine 8, is guided into the interior of the circular mounting plate flange 74, and pushed into frictional engagement with the flange to the point where the flared edge 76 of flange 74 engages the cooperating taper of the ridge 92 on cylinder 82, whereby the pulley 22 and the centrifugal clutch member 104 are aligned and supported for connection.

When the engine 8 is used as a source of mechanical power to drive the refrigeration apparatus, the centrifugal clutch member 104 engages the pulley 22, but when the electric motor 10 is used to drive the apparatus, there is no rotation of the centrifugal clutch member 104, and the engine 8 is then disconnected from the pulley 22 and drive belts 12.

The invention herein described provides a means for connection and support between a driving member and a driven member whereby the driving connection between the members is quickly and readily detached, and the driving member is supported for lateral movement to enable it to be quickly and readily removed from an enclosed unit for maintenance without the need of special equipment. Moreover, the driving member is replaced in its active position, and operably connected to the driven member with similar ease, and also without the need of special tools.

A further and less obvious advantage of the invention arises out of the loading of refrigerated containers onto ships for overseas shipment. While on board ship the unit is operated by the electric motor 10, and the tray 36 containing the engine 8, the battery 38, and the control box 40 may be removed from the refrigeration unit and may be either left ashore, or placed in some type of protective container on board ship to prevent deterioration of the parts from the salt air.

It will be obvious to those skilled in the art that the invention may be modified by many substitutions and equivalents, and therefore it is intended that the invention be defined in terms of the appended claims.

I claim:

1. A power assembly comprising, a fixed driven member, a portable driving member, cooperating means carried by said driving member and said driven member and forming a detachable driving connection between said members, a locking means securing said connection between said members, and a supporting member pivotally attached to a structure supporting said driven member and adapted to support said driving member for lateral movement between a position of engagement with said driven member and a withdrawn position.

2. A power assembly comprising, a fixed driven member, a portable driving member, a circular flange surrounding said fixed driven member, a cylinder surrounding said driving member, a detachable driving connection between said members, said cylinder and said circular flange adapted to slide into frictional engagement to align and support said members for connection, and a supporting member pivotally attached to a structure supporting said driven member and adapted to support said driving member for lateral movement between a connected and a disconnected position.

3. A power assembly comprising a base member, a power transmitting pulley journaled on said base member for axial rotation, a driving member formed with an axially rotatable portion adapted for frictional engagement with said pulley, said driving member being adapted for detachable mounting on said base member, a first cylindrical flange carried by said base member and circumscribing said pulley, and a second cylindrical flange carried by sad driving member circumscribing the axially rotatable portion thereof, and which is adapted to engage with the first-named flange when said driving member is moved in the direction of said pulley to hold said driving member and said pulley in aligned relationship with each other.

4. A power assembly comprising a base member, a power transmitting pulley journaled on said base member for axial rotation, a driving member formed with an axially rotatable portion adapted for frictional engagement with said pulley, said driving member being adapted for detachable mounting on said base member, a first cylindrical flange carried by said base member and circumscribing said pulley, a second cylindrical flange carried by said driving member circumscribing the axially rotatable portion thereof, and which is adapted to engage with the first-named flange when said driving member is moved in the direction of said pulley to hold said driving member and said pulley in aligned relationship with each other, and locking means coacting between said driving member and said base member for securing the connection between the driving member and the pulley.

References Cited

UNITED STATES PATENTS

| | | | |
|---|---|---|---|
| 2,462,115 | 2/1949 | Luecke | 62—448 |
| 2,852,117 | 9/1958 | Sproul | 192—105 |
| 2,874,815 | 2/1959 | Hoffman | 192—115 X |

DAVID J. WILLIAMOWSKY, *Primary Examiner.*

ARTHUR T. McKEON, *Examiner.*